June 14, 1966    E. MEYER ETAL    3,256,422
METHOD, MEANS AND APPARATUS FOR AUTOMATIC CODIFICATION, STORAGE
AND RETRIEVAL OF TOPOLOGICALLY REPRESENTABLE
SCHEMES AND STRUCTURES
Filed Oct. 27, 1960    6 Sheets-Sheet 1

INVENTORS
ERNST MEYER
KLAUS WENKE
GUENTHER LENHARD
BY Marzall, Johnston, Cook & Root
ATT'YS June 14, 1966  E. MEYER ETAL  3,256,422
METHOD, MEANS AND APPARATUS FOR AUTOMATIC CODIFICATION, STORAGE
AND RETRIEVAL OF TOPOLOGICALLY REPRESENTABLE
SCHEMES AND STRUCTURES
Filed Oct. 27, 1960  6 Sheets-Sheet 2

INVENTORS
ERNST MEYER
KLAUS WENKE
GUENTHER LENHARD
BY Marshall, Johnston, Cook & Root
ATT'YS.

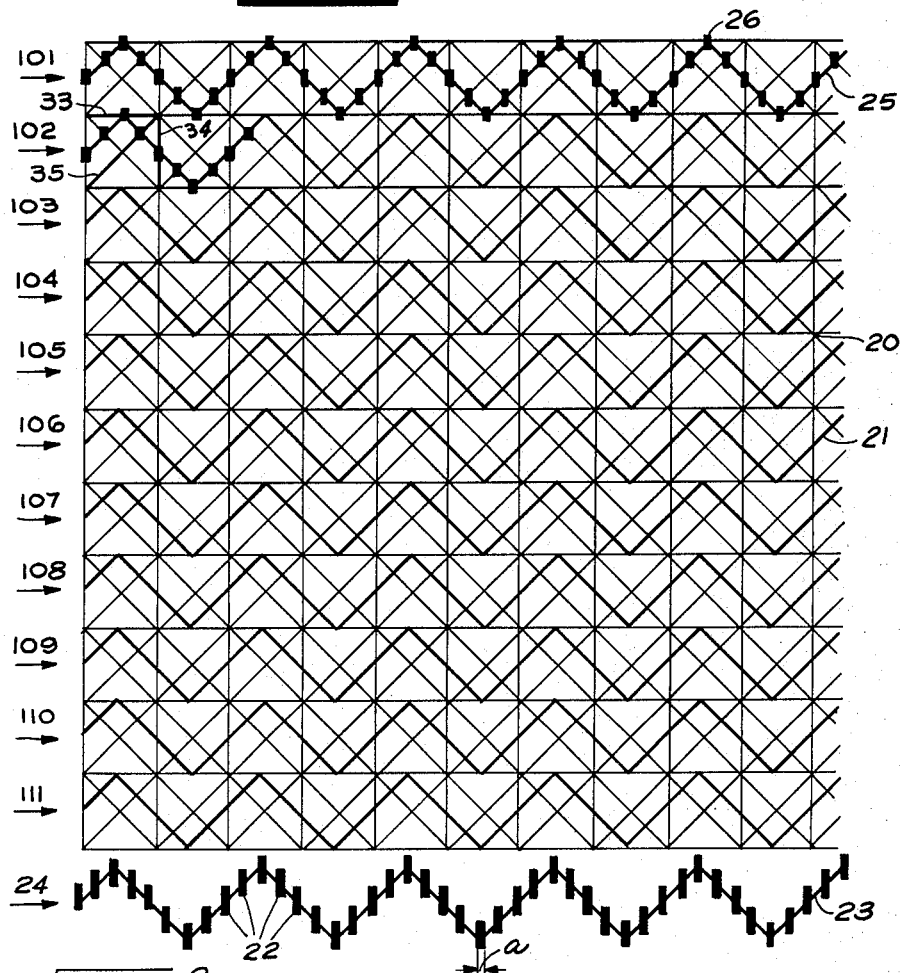
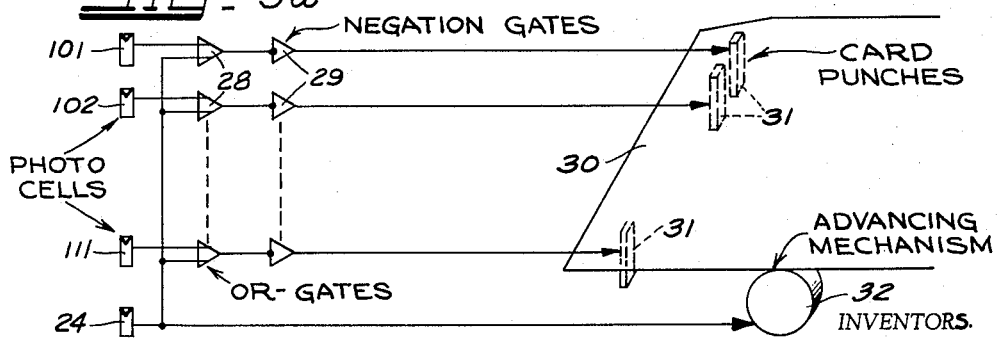

June 14, 1966  E. MEYER ETAL  3,256,422
METHOD, MEANS AND APPARATUS FOR AUTOMATIC CODIFICATION, STORAGE
AND RETRIEVAL OF TOPOLOGICALLY REPRESENTABLE
SCHEMES AND STRUCTURES
Filed Oct. 27, 1960  6 Sheets-Sheet 4
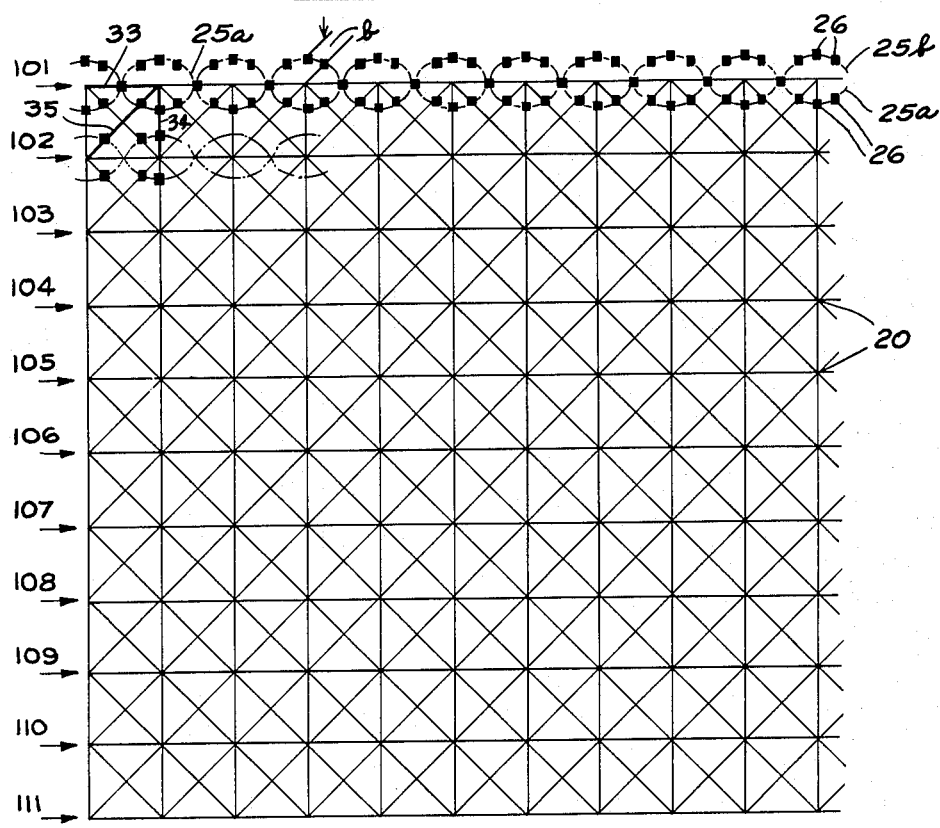
FIG. 4
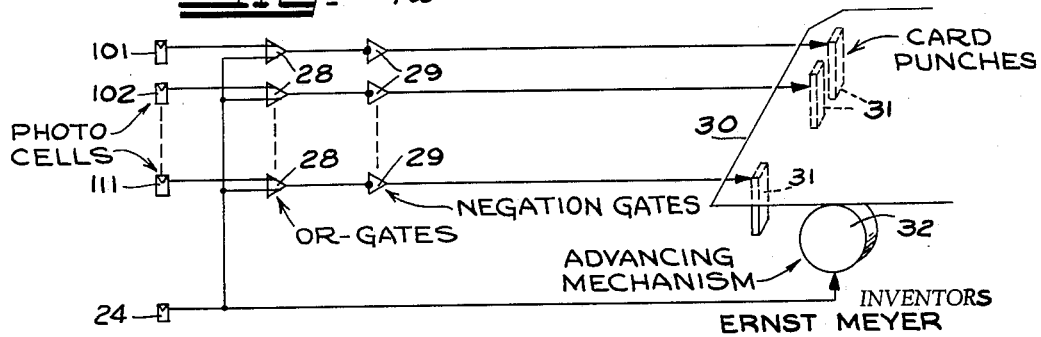
FIG. 4a
INVENTORS
ERNST MEYER
KLAUS WENKE
GUENTHER LENHARD

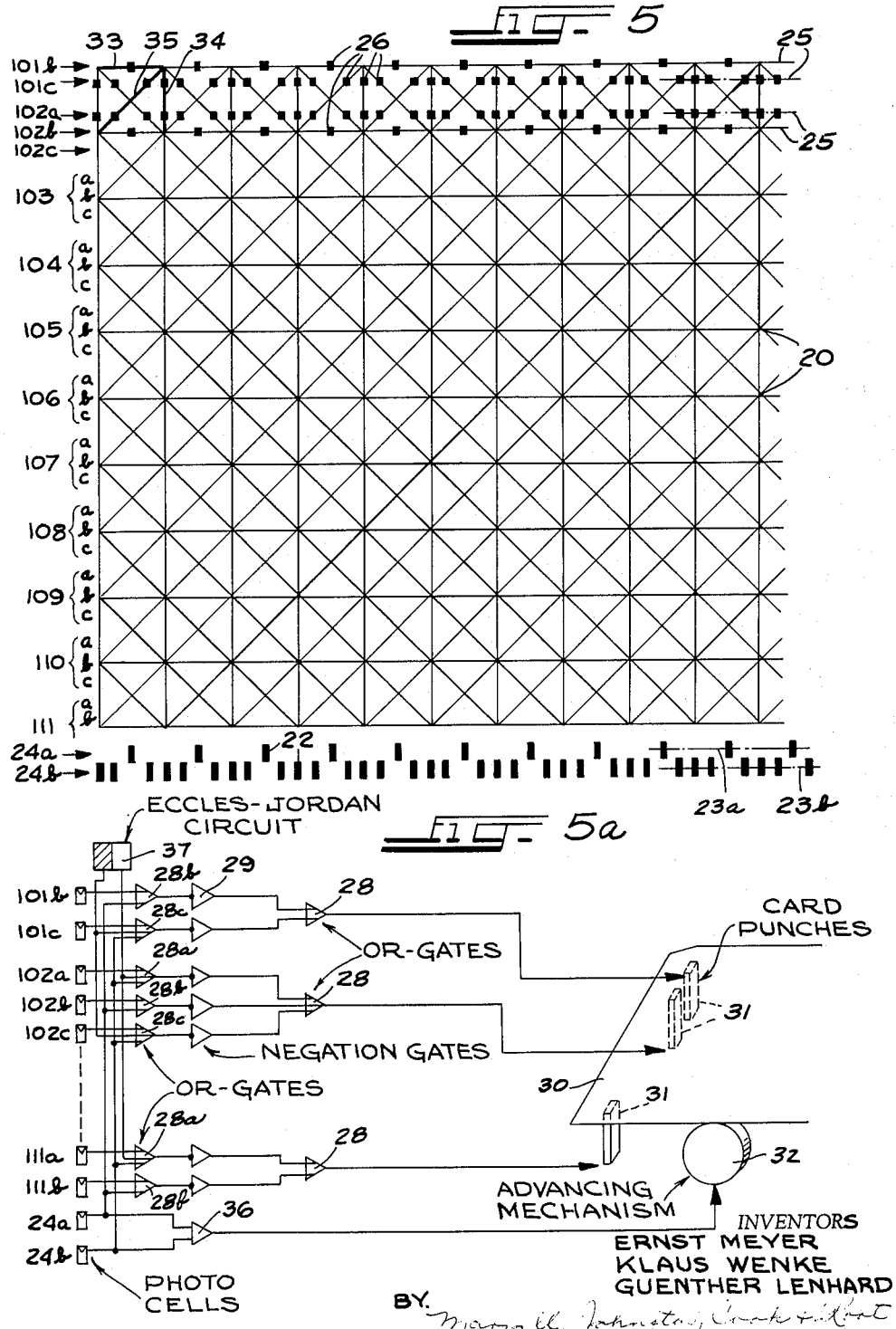

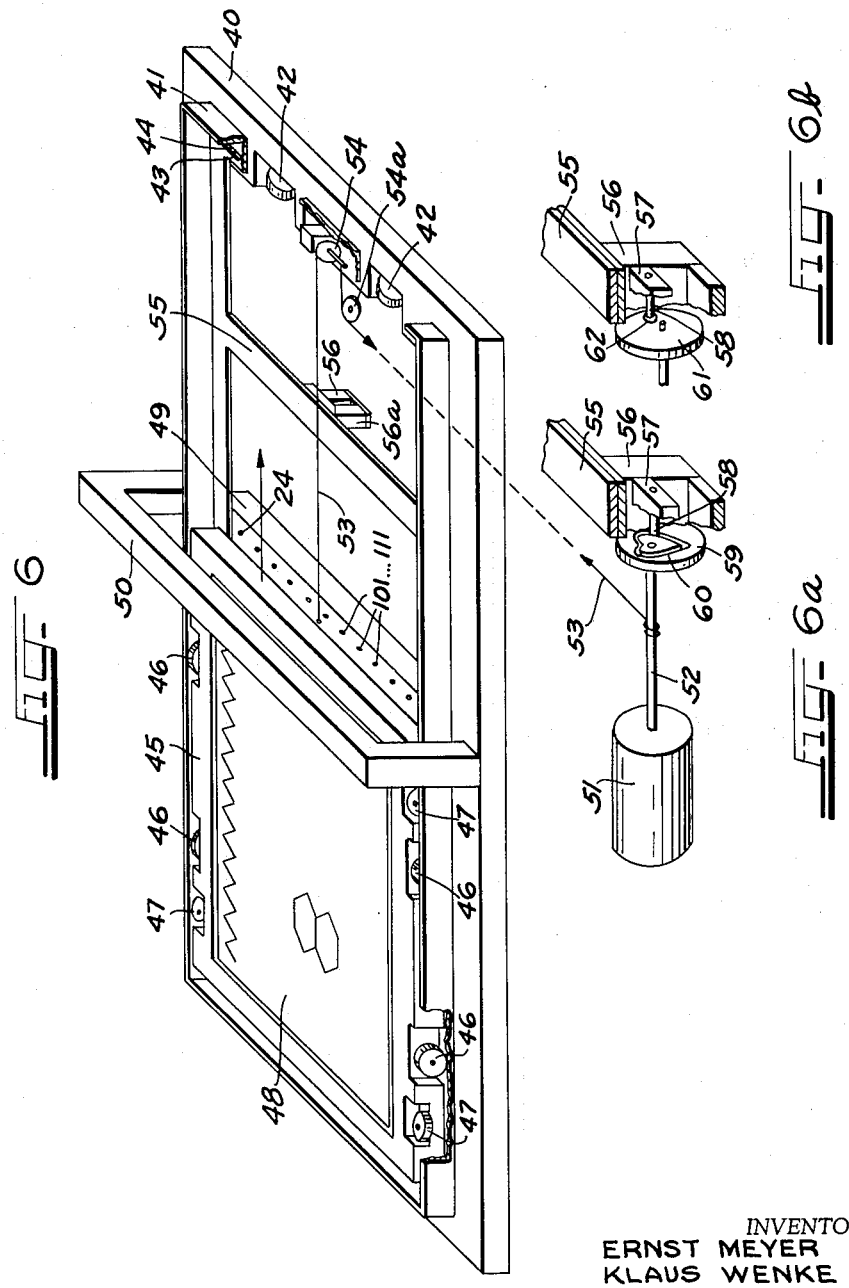

United States Patent Office 3,256,422
Patented June 14, 1966

3,256,422
METHOD, MEANS AND APPARATUS FOR AUTOMATIC CODIFICATION, STORAGE AND RETRIEVAL OF TOPOLOGICALLY REPRESENTABLE SCHEMES AND STRUCTURES
Ernst Meyer and Klaus Wenke, Ludwigshafen (Rhine), and Guenther Lenhard, Mannheim-Gartenstadt, all in Germany, assignors to Badische Anilin- & Soda-Fabrik Aktiengesellschaft, Ludwigshafen (Rhine), Germany
Filed Oct. 27, 1960, Ser. No. 65,449
Claims priority, application Germany, Oct. 31, 1959, B 55,354
14 Claims. (Cl. 235—61.11)

This invention relates in general to digital-type computers.

More especially, the invention relates to switching circuits used for handling logical problems with the aid of the algebra of relay and switch contacts.

Still more especially, the invention relates to techniques of automatic information storage and retrieval using automatic data processing systems.

The invention relates specifically to the automatic codification, storage and retrieval of topologically representable structures such as schemes, especially of molecular structures in the field of chemistry.

In documentation it is often desired to code and store plane topological structures, if possible by mechanical means in such a way that certain specific structures which satisfy a particular search requirement can be retrieved from a large number of coded structures by mechanical means. The system should make it possible for the structure or structures retrieved to be made up to the complete structure or structures (documents) as filed. Such a system would be particularly desirable in organic chemistry for coding structural formulae, but no satisfactory solution to the problem of mechanical coding has hitherto been found.

It is an object of the present invention to provide a system and an apparatus for reproducibly coding and storing by mechanical means all the information contained in Kekulé formulae, under which system the machine file can be searched for either specific complete structures or any fragments thereof having special characteristics.

Methods of information storage that satisfy the above requirements have already become known. However, the known methods for coding chemical structural formulae are to a large extent carried out by hand and require considerable expenditure of time and skill (cf. Report 6865 of the National Bureau of Standards, "A Survey of Computer Programs for Chemical Information Searching," by Ethel Marden, National Bureau of Standards, and Herbert R. Koller, U.S. Patent Office).

A conventional coding procedure is, for example, as follows (cf. Report 5115 of the National Bureau of Standards, "The Use of ADPS in the retrieval of technical Information," by L. C. Ray and R. A. Kirsch):

(1) A given structural formula is broken down into its components (atoms and all bonds other than single bonds) and the said components are numbered serially in any arbitrary order or according to certain predetermined coding rules.

(2) One unit of computer storage, usually called a word, is allotted to each atom to represent its position in the structure. Listed in a definite order, such a word includes:
  (a) the serial number itself;
  (b) a symbol characterizing the component;
  (c) the serial numbers of the components to which the component to be characterized is attached for example by a chemical bond;
  (d) any further information regarding structural characteristics and the nature of the connection or connections of each component to neighboring components in the structure.

The complete code thus formed which consists of a plurality of "words" and which may be regarded as the characteristic coding block ("document") for the particular structure is stored, for example on magnetic tape.

It is desired to search a plurality of documents for a structure or structures which are identical, or have some generic property in common, with the question structure, a topological picture is first of all prepared of the question structure, the coding system being the same as for the file structure. The components of the question structure may be numbered in any arbitrary order, i.e., the question file need only be similar or equivalent to, but not identical with, the file structure. Equivalency can be determined by means of an electronic data processing machine and any desired information isolated from the machine file.

The said method lends itself to the encoding of chemical structural formulae, but other plane, topologically representable structures, such as electrical circuit diagrams, can also be encoded.

In the method described above it is most troublesome and time-consuming that both the serial numbers of each component in the structure and the serial numbers of the connections between the individual components have to be noted by hand and later transferred to storing means, for example punched cards. Moreover, in the coding method in question there is a high incidence of errors.

An essential feature of our invention is a method and apparatus for the automatic codification and storage of topologically representable structural diagrams for use with conventional electrical and mechanical systems.

According to the new procedure, the structure is first represented on a suitable support, hereinafter referred to as a "sheet," by means of its individual components. The sheet is provided with a standardized coordinate grid system (grid). In the coordinate grid system of the sheet, the components of the structure are represented by dots of the grid which are directly connected with horizontal, vertical or diagonal lines which can be evaluated with mechanical, optical, magnetic and/or electrical means. The sheet which has thus been provided with the structure diagram is fixed in the apparatus. Then the lines of the structure diagram are scanned systematically by areas by means of relative movements between the sheet and scanning means provided in the apparatus, and converted into pulses, preferably electrical pulses. These pulses are stored in a memory. Another feature of the invention is that the relative movements between the sheet and the searching or scanning means are straight-lined. A further feature of the invention is that oscillatory movements are superimposed upon the straight-line movements, the oscillatory movements being either zigzag-shaped or sinusoidal.

Another feature of the invention is that the sheet containing the structure diagram is provided with one or more timing tracks as well as with a grid, the timing track or tracks serving, inter alia, for temporarily sensitizing the scanning means to the structure diagram.

According to yet another feature of the invention, punched cards are provided as storing means and card punches as pulse transmitters, the said punched cards and card punches being used in conjunction with apparatus for the automatic codification of topologically representable structures.

The invention will now be described with reference to examples of coding as well as the accompanying drawings.

FIG. 3 shows a sheet provided with a grid and timing tracks, as well as its position to the scanning means, scanning being by way of zigzag coding movements.

FIG. 3a shows a diagrammatic form a coupling mechanism required for a card punch.

FIG. 4 shows a sheet provided with a grid and timing tracks, as well as its position to the scanning means, scanning being by way of two sinusoidal coding movements.

FIG. 4a shows in diagrammatic form a coupling mechanism required for a card punch.

FIG. 5 shows a sheet similar to the sheets shown in FIGS. 3 and 4, which is scanned by three scanning means for each abscissa of the grid, scanning being by way of two straight-lined coding movements.

FIG. 5a shows diagrammatically a coupling mechanism required for a card punch.

FIG. 6 shows a coding means for a straight-line and/or oscillatory coding movement capable of receiving any of the sheets according to FIGS. 1 to 5 containing the structure to be coded.

FIGURE 6a shows one modification for use in the arrangement of FIGURE 6.

FIGURE 6b shows another modification for use in the arrangement of FIGURE 6.

The sheet on which the structure to be coded is recorded must have a standarized grid in order that a large number of comparable and storable documents may be produced. The dots of the grid may for example be intersections of a number of ordinates and abscissae of a rectangular coordinate grid system. The distance between the intersections of the grid determines the length of the connecting lines to be scanned in the structure diagram to be coded. The structure diagram is made up of horizontal, vertical and diagonal lines connecting neighboring grid intersections. The size and structure of the grid also determine the distance between the individual scanning means provided in the coding apparatus. The grid shown diagrammatically in FIG. 1 pertaining to a sheet of the type used for automatic codification is divided up into squares whose sides are inclined to ordinates 1 to 7 and abscissae A to L at an angle of 45°, each square being defined by 4 adjacent intersections of the grid. Only the sides and diagonals of the grid squares are tolerated on the sheet receiving the structure diagram, but no other connecting lines. The individual components of the structure to be coded are entered in the grid. The lines connecting the components of the structure diagram are marked in such a way as to suit the sensitivity of the scanning means provided in the coding apparatus. This means that with optical or light-sensitive scanning means the connecting lines are entered on the grid in black, the sheet containing the grid consisting of some transparent material. With electrically conducting scanning means, the structural lines are made conductive. It is also possible to impregnate the sheet with ferromagnetic substances, magnetize the structural lines and employ scanning means similar to recording heads as used in magnetic tape recorders. The lines may also be embossed on the sheet or punched out, if mechanical scanning means are provided that convert the mechanical pulses obtained in passing the lines into electric pulses.

Figure 1:
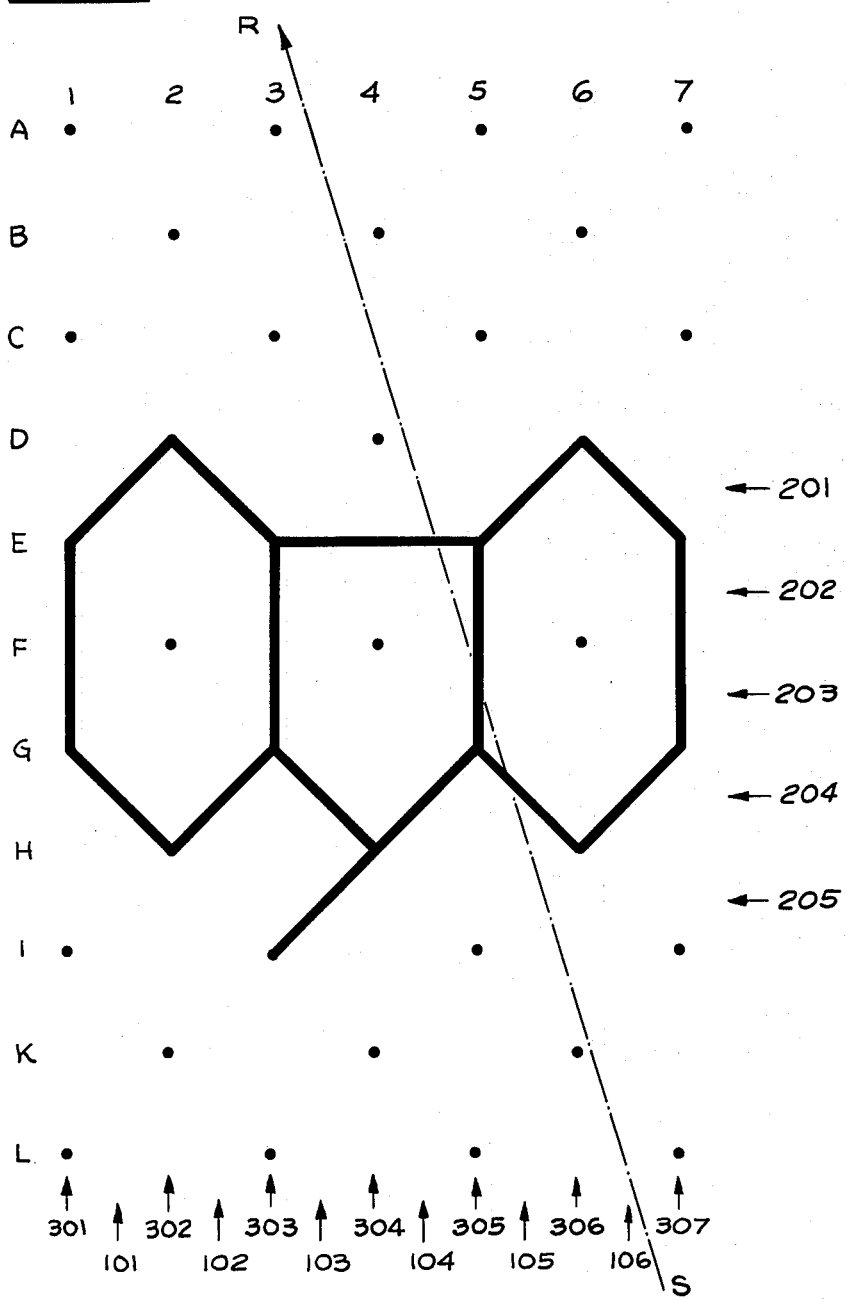
FIG. 1 shows in diagrammatic form a sheet which can be used for automatic codification, featuring a dotted grid with coordinates A1 to L7, the grid containing a structural diagram. Also shown is the adjustment of the grid to the scanning means, the coding movement being straight-lined.

The structure diagram marked on the sheet is scanned as follows:

The sheet shown in FIG. 1 which contains the structure and any additional information is passed over a plurality of scanning means 101 to 106 in a direction parallel to the ordinate A to L. The said scanning means are coupled with an electronic plant in such a way that the pulses formed in dependence on the structure diagram occupy different storage cells at different times in a file of conventional design. This procedure, called synchronization, is illustrated by the following example:

It is assumed that the sheet illustrated in FIG. 1 showing a structure diagram marked on the grid is passed under a scanning means 104. If, upon the sheet passing thorough ordinates H and G, a pulse is generated when the sheet is half-way between H and G and this pulse is registered in a storage cell T, such occupied storage cell T will clearly show in subsequent data processing that a connection exists between intersections H4 and G5. If, during passage of the sheet, a further pulse reaches the scanning means—when the sheet passes ordinate E—then as a result of synchronization the said pulse is registered in another storage cell $T_2$, the occupation of which clearly indicates a connecting line between intersections E3 and E5.

The contents of the file obtained by systematic scanning in the way described above are fed into a data processing plant of conventional design. If desired, intermediate storage means, for example magnetic tape, may be used. The data processing plant will then automatically prepare documents similar to those obtainable by the above-described known methods of codification by hand.

If the sheet is passed over the scanning means 101 to 106 in the direction of the grid ordinate, the connecting lines parallel to the coding movement (e.g., E3 to G3 in FIG. 1) will not be registered by the scanning means 101 to 106 passing between the intersections. Scanning may be completed in various ways as follows:

(1) The sheet is scanned a second time by passing it under a second series of scanning means at a certain angle to the direction of the first passage. The marked connecting lines of the structure diagram which have not been registered in the first passage are then picked up by special storage cells in an analogous manner.

(2) It is also possible, when using an arrangement of the type shown in FIG. 1, to provide a second set of scanning means 301 to 307 in such a way that scanning takes place just above the intersections of the grid. Provision must then be made that intersections of the grid are not registered as lines. This may be achieved, for example, by temporarily interrupting the pulse circuit of the scanning means. Or the scanning means are sensitized so as to pick up only markings larger than an intersection by using means oriented in a certain direction. Photoelectric cells or magnetic heads having a longitudinal-type (not a point-type or circular-type) recording characteristic are suitable for the purpose. Another solution consists in entering the components in such a form or color that they are not picked up by the scanning means used.

(3) A further possibility consists in moving the sheet at an angle to the grid, for example along the dot-dash line shown in FIG. 1, while suitably adjusting synchronization. Passage at an angle ensures that all lines connecting two grid intersections are picked up by a single set of scanning means.

(4) Furthermore, it is possible to move the sheet past the scanning means not only in a straight line, but to superpose upon the straight-line movement a second, preferably oscillatory, relative movement of the sheet to the scanning means. In this way, all lines are picked up in a single passage.

In carrying out the process according to our invention it is not essential that a sheet be passed under a plurality of rigidly arranged scanning means. It is only necessary to make provision for a relative movement of the sheet containing the structure diagram to one or more scanning means while simultaneously controlling the pulses received with respect to time and transmitting them to storage cells correlated to definite coordinate areas of the grid.

Figure 2:
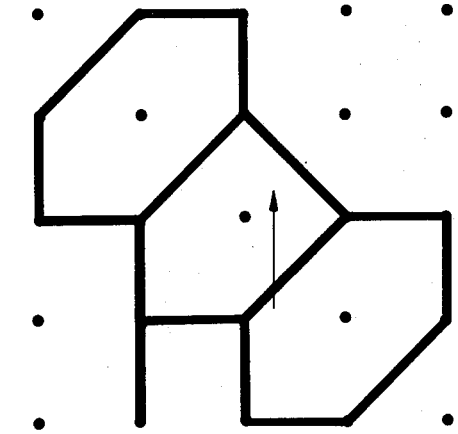
FIG. 2 shows a sheet with a similar grid having a structural diagram in a different position, and the adjustment of the grid to the scanning means, the coding movement being straight-lined.

In FIG. 2 the arrangement of the dots in the grid of the sheet is different from that in FIG. 1 without deviating from the basic inventive concept of automatic codification of a structure diagram. The fact that a pulse is generated in scanning means 104 when a sheet according to FIG. 1 passes exactly through the middle of lines I and H does not clearly show whether a diagonal line exists between I4 and H5 or between H4 and J5. This difficulty can be avoided by displacing the scanning means sideways so that the pulses generated by the two diagonal lines are released at different times, instead of passing the scanning means over the intersections of two diagonals, i.e., the centers of the grid squares. An obvious advantage of a gridded sheet according to FIG. 2 over a sheet according to FIG. 1 is that larger structure diagrams can be evaluated while retaining the same grid dimensions.

Another feature of the automatic coding method described is that all intersections of the grid on which the structure to be coded is marked must be given serial numbers but only part thereof is required for codification. The numbers representing the documents are therefore usually larger than in the case of codification by hand and thus require a larger supply of storage cells in the document file in the first feeding operation. It is possible, however, by means of a simple program of a data processing system, to transform these large serial numbers into a continuous series of numbers starting from 1.

With the aid of the above-described means according to our invention, codification of a structure diagram will be taken care of by a substantially automatic plant only to the extent that the components of the structure are directly connected with one another. Frequently, however, the code in order to be complete should include such information as the nature and characteristics of the components and the type of bond existing between them. For example, if the structure to be coded is a chemical formula and the components of the structure are individual atoms, the chemical elements represented by the individual marked intersections of the grid have to be identified. The document must further contain information regarding any double or triple bonds existing between certain atoms of the structure. It is only when all this information is available that the data processing plant can prepare complete and final documents.

There are various possibilities of feeding such additional information into the machine file of a data processing plant, for example by means of a keyboard or, in known manner, by way of punched cards. For completion of the documents the additional information may at any time be retrieved from the data processing plant. It is also possible to characterize certain components, e.g., carbon atoms, by extra-large dots and to make provision for such dots to be automatically registered by specially sensitized scanning means while, in accordance with accepted coding rules, other atoms, e.g., hydrogen atoms, may remain unmarked for the purpose of automatic codification. Further types of atom, e.g., nitrogen atoms, may be characterized on the sheet by their position by punching or by optical, mechanical, electric or magnetic markings. Such markings may also be entered on places outside the grid area. An advantageous method consists in using different types of marking to characterize different kinds of additional information by using, for example, optical markings for carbon atoms, magnetic ones for nitrogen atoms, etc. If an apparatus for automatic codification of structure diagrams according to our invention features exclusively optical means, different colors may be used for marking and scanning may be effected by means of groups of photocells sensitive to the particular colors. For practical reasons it is desirable that the grid area to be scanned in the coding apparatus be relatively small. It may therefore happen that there is insufficient space for a topological structure to be coded. In this case the structure diagram is divided into two or more fragments and these fragments are entered separately on different sheets. The chemical bonds which are cut by this procedure are communicated to the data processing system by other means, e.g., by a keyboard or by punched cards, so that by means of a suitable program the individual fragments can be composed by the machine to a single coding block. This coding block is identical with that of the same coded structure prepared with a sufficiently large grid area.

FIG. 3 shows a sheet provided with a coordinate grid system, the intersections being designated as "20." A structure diagram to be coded which has been entered on the grid is scanned in a direction parallel to the abscissa of the system, an oscillatory movement being superposed upon the general coding movement. In accordance with the general coding movement, the initial position of the scanning means 101 to 111 is on the left of the grid. The sheet according to FIG. 3 is intended especially for scanning by means of zigzag or triangular movements. Scanning is by means of a device which is connected to a card punch. The zigzag-shaped tracks described by the scanning means during codification of the structure diagram are designated "21." The "zero lines" of the zigzag tracks 21 lie in the middle between two lines of the grid, assuming that intersections 20 of the grid are interconnected so as to define lines. In a sheet according to FIG. 3, the scanning means 101 to 111 are so arranged in the coding apparatus that they oscillate around the zero lines. In addition to tracks 21 the sheet features a timing track 23 which is made up of timing marks 22 and whose generally horizontal direction is in line with the scanning direction of a scanning means 24 arranged in the coding apparatus. Both the track 23 and the grid are markings which have, for example, been printed on the sheet. The timing marks 22 synchronize the movements of the coding apparatus and the attached card punch with respect to the coordinate areas of the grid. The relative movements of the sheet to the scanning means 101 to 111 being zigzag-shaped, the arrangement of the timing marks 22 in the generally horizontal direction of movement is also zigzag-shaped. At the top of the sheet there is shown a track 25 with rectangular marks 26 which determine the sensitivity times of the scanning means scanning this line during coding. The duration of sensitivity is controlled for all scanning means 101 to 111 by scanning means 24 with the aid of timing track 23, the duration of sensitivity being dependent on the width of the timing marks 22 in the said timing track 23. With respect to the relative movement of the sheet containing the structure diagram to the scanning means, the sensitivity time is the quotient of the width "$a$" of a timing mark 22 of the timing track 23 and the relative speed of the sheet to the scanning means 101 to 111.

The circuit diagram shown in FIG. 3a illustrates how the coding apparatus is connected to the card punch. The impulses generated by the photoelectric scanning means 101 to 111 and the time control pulses are transmitted by means of logical circuit elements to the card punching mechanism.

By means of symbols usual in the data processing art, the circuit diagram 3a shows an OR-gate 28, a negation gate 29, a card 30, card punches 31 of the punching mechanism and a card advancing mechanism 32.

*Example 1*

In the top left corner of the standardized grid of the sheet diagrammatically shown in FIG. 3, a structure diagram is entered which consists of four adjacent intersections directly connected with one another by a horizontal, a vertical and a diagonal line marked for scanning. The lines to be scanned are designated by the numbers 33, 34 and 35. For codification of the said structure, the prepared sheet moves continuously from right to left with a superposed zigzag movement (relative to the scanning means 101 to 111 arranged to the left), or the scanning means 101 to 111 move from left to right as indicated by the arrows. While the first two timing marks 22 of the timing track 23 are being picked up, the control circuits for storage pulses are opened. The scanning means 101 to 111 do not however supply any storable pulses and the card is not perforated. During the intervals between the first and second, and second and third, timing marks 22 only the card advancing mechanism is excited, a detailed description of the process being given below.

In the present example, the scanning means 24 is a photoelectric cell which, while passing the timing marks 22 of the timing track 23, each time supplies the information "0" to all of the OR-gates 28 in circuit diagram 1a. At the same time, the pulse circuit of the scanning means 102 is temporarily sensitized and—as it has by this time reached the marked horizontal line 33 of the structure to be coded and is thus obscured—likewise supplies the information "0." Consequently, the information "0" is also available at the output terminal of the topmost OR-gate 28 in circuit diagram 3a and is converted into the information "1" by the corresponding negation gate. According to circuit diagram 3a, this information "1" causes the corresponding punch 31 to punch a hole in the third column of the second line of the card 30.

Between the said third and the following fourth timing mark 22, the scanning means 24 supplies the information "1." All the control circuits are thereby blocked for storage pulses, and only the card advancing mechanism 32 is excited. The card 30 is thereby advanced by one column. Then, while the fourth timing mark 22 of the timing track 23 is passed, the marked diagonal connection 35 is scanned in the same manner as described above, a perforation thus being produced in the fourth column of the second line of the card 30. The card is then advanced by another step on account of the information "1" supplied by the scanning means 24. Subsequently scanning of the marked vertical connection 34 of the structure to be coded takes place.

During the following sixth scanning interval, information "1" remains the same for the scanning means 102. Consequently, the negation gate 29 supplies the information "0" and no perforation of the card 30 takes place.

The coding steps which have so far been described teach that the scanning element 24 supplies control pulses to the advancing mechanism 32 of the card punch only between the timing marks 22 of the timing track 23. It is thus ensured that the card is punched and advanced alternately. If a sheet designed according to FIG. 3 for a zigzag coding movement is used, only about four storage cells are required for every grid intersection of the sheet. As compared with the slightly modified coding movements described below, the foregoing method ensures optimum utilization of the total storage capacity available. With the coding movement according to FIG. 3, there is however no direct possibility of checking whether a certain perforation in the card 30 does in fact correspond to the structure to be coded or has perhaps been caused by a defect in the gridded sheet.

The sheet shown in FIG. 4 moves from right to left, and in addition performs sinusoidal movements, relative to the scanning means 101 to 111. In contradistinction to the sheet according to FIG. 3, in FIG. 4 the zero lines of the scanning means 101 to 111 coincide with the horizontal lines of the grid. Two passages are required for scanning all the marked lines of a structure entered in the sheet according to FIG. 4. The superposed sinusoidal oscillation of the second passage must be in opposite phase to the sinusoidal oscillation of the first passage. As two passages are required, it follows that for codification of a structure by means of a coding movement as proposed for the sheet according to FIG. 4 twice as much storage capacity as for a sheet according to FIG. 3 must be available. Consequently, an average of eight storage cells is provided for every grid intersection 20 of the sheet. The advantage of the coding movements proposed for the sheet according to FIG. 4 consists in the fact that every line, i.e., every potential or actual connection between two grid intersections 20, is scanned twice. Twofold line-by-line scanning of the structure affords a checking means which contributes toward eliminating the generation of storage pulses by defects in the gridded sheet. The amplitude $b$ of the superposed sinusoidal coding movement is dependent on the distance between the adjacent grid intersections. According to our invention, the storage pulses become periodical when the relative horizontal speed of the sheet to the scanning means is constant and the amplitude $b$ of the sinusoidal oscillation is $$\frac{a}{4}\sqrt{2}$$

"$a$" representing the vertical distance between two grid intersections (see connecting line 34). In accordance with the two opposite-phase coding movements performed in two successive passages, the timing track scanned by the scanning means 24 consists of two tracks 23a and 23b with timing marks 22 arranged in an approximately sinusoidal track. The periods for which the scanning means 101 is sensitized during the two passages are illustrated in the sheet represented in FIG. 4 by the surface extension of the marks 26 in two tracks 25a and 25b. It can be seen from the position of the marks 26 that, considering the movement performed, each pulse circuit of the scanning means 101 to 111 is sensitized only in the neighborhood of a horizontal, vertical or diagonal connecting line between two adjacent grid intersections. In FIG. 4, the numbers 33, 34 and 35 again designate three marked connecting lines of a structure diagram entered in the grid.

The block diagram shown in FIG. 4a, which illustrates the connection of a card punch to the coding apparatus which is used in conjunction with a sheet according to FIG. 4, is equivalent to the block diagram shown in FIG. 3a.

The block diagram shown in FIG. 4a, illustrates the connection of a card punch to the coding apparatus which is used in conjunction with a sheet according to FIG. 4. The impulses generated by photoelectric scanning means 101 to 111 and the time control pulses are transmitted by means of logical circuit elements, i.e., an OR-gate 28 and a negation gate 29 to the card punching mechanism, comprising a card 30, punches 31 and an advancing mechanism 32.

*Example 2*

For codification of a structure marked on a sheet according to FIG. 4, the gridded sheet moves continuously from right to left relative to the scanning means 101 to 111. After two timing pulses, which do not supply coding pulses to be stored by way of a card perforation but only excite the card advancing mechanism 32, the third timing mark 22 from the left is reached by the scanning means 24. While scanning all the timing marks 22 of the timing tracks 23a and 23b, the scanning means 24 supplies the information "0" to all of the OR-gates 28 during the two consecutive passages of the sheet. At the same time the scanning means 101, during the first passage along the track 25a (which illustrates the periods of sensitivity), whose phase position is identical with that of the timing track 23a, by obscuring the line 33 likewise supplies the information "0." Thus the information "0" is also available at the output terminal of the topmost OR-gate 28 and is converted by the nagation gate 29 into the information "1." The information "1" present at the output terminal of the nagation gate 29 causes the corresponding punch 31 to punch a hole in the first line of the third column of the card 30. Between the third and fourth timing pulses, the scanning means 24 supplies the information "1" from the timing track 23a. This temporarily blocks all the control circuits for storage pulses, but the card advancing mechanism 32 is excited and the card 30 is advanced by one column. During the following six timed scanning periods, the scannnig means 101 constantly supplies the information "1," since the track 25a of the scanning means 101 does not cross another marked line. Consequently, the negation gate 29 supplies the information "0," which does not produce a perforation in the card 30. On reaching the fifth timing mark from the left, however, the scanning means 102 picks up the line 34. According to the switching operations described above, this means that a hole is punched in the fifth column of the second line of the card 30. During perforation of the second card during the second passage of the sheet through the coding apparatus, the scanning means 101 and 102 follow the tracks 25b. Consequently, during the second timing pulse, the line 35 is picked up by the scanning means 102, during the third timing pulse the line 33 is picked up by the scanning means 101, during the fourth timing pulse the line 35 is picked up by the scanning means 101, and during the fifth timing pulse the line 34 is picked up by the scanning means 101. Each of the lines 33 and 35 is thus stored twice by way of card perforations as follows:

|  | First perforation | | | Second perforation | | |
|---|---|---|---|---|---|---|
|  | Card | Line | Column | Card | Line | Column |
| Line 33 (horizontal) | 1 | 1 | 3 | 2 | 1 | 3 |
| Line 35 (diagonal) | 2 | 2 | 2 | 2 | 1 | 4 |
| Line 34 (vertical) | 1 | 2 | 5 | 2 | 1 | 5 |

FIG. 5 illustrates a sheet with topologically represented structures to be coded. In order to make use of checking means provided by the storage-active pulses similar to those afforded when a sheet according to FIG. 4 is used, the structure entered in the sheet according to FIG. 4 performs only a straight-line movement relative to the scanning means. The sheet according to FIG. 5 differs from the above-described sheets for the automatic codification of structure diagrams inasmuch as the coding apparatus is provided with scanning means 101b to 111b, three scanning means (a, b and c) being arranged for each horizontal connecting line between grid intersections 20. Each of the scanning means b of the sets of scanning means 102a, b and c to 110a, b and c is directly in line with one of the said horizontal grid lines. Consequently, the scanning means a and c are situated at a certain distance above and below the horizontal lines, respectively. It follows from this that only two scanning means each (101b and c, and 111a and b, respectively) are present for the upper and lower horizontal boundary lines of a sheet according to FIG. 5. The sensitivity periods of the scanning means 101b and 111b, which are determined by the timing marks 22 of the tracks 23a and 23b, are illustrated for four scanning means 101b to 102b in the upper line of the grid by means of the surface extension of the marks 26. In conformity with the straight-line coding movement and the position of the scanning means 101b to 102b, the said marks 26 are situated in four horizontal lines or tracks 25. For the sheet according to FIG. 5, all of the scanning means 101b to 111b are cut through in accordance with the circuit diagram shown in FIG. 5a, in dependence on two timing tracks 23a and 23b provided with timing marks 22 in different manners, via the OR-gates 28 and the negation gates 29 to the punches 31 of the card punching mechanism. For scanning the timing marks 22 of the timing tracks 23a and 23b, scanning means 24a and 24b, respectively, are situated in line with the said two timing tracks. The pulse transmission mechanism according to FIG. 5a comprises three series of OR-gates 28a, 28b, and 28c with respect to the series of scanning means 101b, c to 111a, b; and a series of negation gates 29 followed by another series of OR-gates 28. It further includes an AND-gate 36 as well as an Eccles-Jordan circuit 37 for the first and second passages of the sheet according to FIG. 5. In the following example, the connecting lines between grid intersections of a structure represented in the top left corner of the grid are again designated by the numbers 33, 34 and 35.

*Example 3*

In the timing track 23a the first timing mark 22 from the left is picked up by the scanning means 24a. As in Examples 1 and 2, the scanning means 24a is a photoelectric cell which during scanning of the timing marks 22 of the timing track 23a supplies the information "0" to all OR-gates 28b. At the same time, the scanning means 101b also supplies the information "0" during the first passage of the sheet, since the line 33 is obscured. The same information "0" is therefore also available at the output terminal of the OR-gate 28b. At the same time, the scanning means 101b also supplies the information "0" during the first passage of the sheet, since the line 33 is obscured. The same information "0" is therefore also available at the output terminal of the OR-gate 28b, is inverted by the negation gate 29b and, by way of the following OR-gate 28, actuates the punch 31 for the first line of the card 30. A hole is punched in the third column of the first line of the card 30. For the fourth and fifth columns of the card, the scanning means 24b and 101c supply the information "0," but the Eccles-Jordan circuit 37 supplies the information "1," so that no perforation of the card takes place. The same Eccles-Jordan circuit 37 supplies to the OR-gates 28a the information "0," so that during the second timing pulse of the track 23b the scanning means 24b and the scanning means 102a, being obscured by the line 35, supply the additional information "0." Consequently, the punch 31 of the second line is actuated via the corresponding OR-gate 28, the negation gate 29a and the following OR-gate 28 and punches a hole in the second column of the card 30. While scanning the spaces between the timing marks 22 of the tracks 23a and 23b, the scanning means 24a and 24b always supply the information "1," so that at the output terminal of the AND-gate 36 in these spaces the information "1" is available to actuate the card advancing mechanism 32. While the second card is being punched during the second passage of a sheet according to FIG. 5, the Eccles-Jordan circuit 37 switches to the other stable position and thus blocks the OR-gates 28a while at the same time opening all of the OR-gates 28c. Thus, during the first timing pulse of the track 23a the line 33 is again picked up by the scanning means 101b, during the third timing pulse of the track 23b the line 35 is picked up by the scanning means 101c, and during the fourth timing pulse of the track 23b the line 34 is picked up by the scanning means 101c, perforations being produced in the corresponding columns and lines of the card 30.

The lines 33, 34 and 35 are therefore stored as follows:

|  | First perforation | | | Second perforation | | |
|---|---|---|---|---|---|---|
|  | Card | Line | Column | Card | Line | Column |
| Line 33 (horizontal) | 1 | 1 | 3 | 2 | 1 | 3 |
| Line 35 (diagonal) | 1 | 2 | 2 | 2 | 1 | 4 |
| Line 34 (vertical) | 1 | 2 | 5 | 2 | 1 | 5 |

If double perforation, which affords a means of checking, is dispensed with, a coding apparatus with optimum utilization of the storage capacity as described in Example 1 can be provided by omitting the scanning means 101a to 111a or the scanning means 101c to 111c and using a sheet according to FIG. 5.

FIG. 6 illustrates an example of an arrangement of a coding apparatus for the automatic scanning of topologically represented structure diagrams using gridded sheets according to the above detailed description.

A section frame 41 is arranged on a base frame 40, where it can be moved to and fro on roller bearings 42.

Milled-in slots 43 in the horizontal part of the section frame 41 in conjunction with guide pins 44 fixed on the base plate 40 prevent the section frame 41 from moving longitudinally on the base frame 40. A sliding carriage 45 provided with roller bearings is arranged inside the section frame 41, and this can easily be moved in the section frame 41 in longitudinal direction, i.e., from left to right and vice versa. The sliding carriage 45 is further guided laterally by horizontally arranged roller bearings 47. These roller bearings 47 are spring-loaded and press against the vertical parts of section frame 41. The sliding carriage 45 can thus perform longitudinal movements in the frame 41 without lateral play. A transparent plate 48 is placed in the frame of the sliding carriage 45, upon which the gridded sheet provided with the structure to be coded is fixed. The dimensions of the transparent plate 48 in particular and those of the sliding carriage 45 and the two frames 40 and 41 in general therefore depend on the size of the standardized and gridded sheets used for automatic codification.

The side members of the frame 40 are connected by means of a cross member 49 under the section frame 41 and the sliding carriage movably arranged inside the latter. The cross member 49 incorporates the above-described scanning means 101 to 111, e.g., photoelectric cells, used for scanning the coordinate areas of the gridded sheet, the number of the scanning means depending on the size and subdivision of the grid. In addition to the scanning means 101 to 111, the cross member 49 incorporates one of more scanning means 24 which serve for scanning the timing marks 22 in the timing track 23 recorded on the sheet. In the horizontal part of a bridge member 50 arranged on top of the base frame 40 light sources are provided which supply the luminous flux required for the photocells used as scanning means. Depending on the type of photoelectric cells used, the luminous flux from bridge member 50 may be aimed at the photocells arranged in the cross member 49.

For the straight-line movement of the sliding carriage 45 in the section frame 41 the following parts are provided. By means of a rope 53 attached to the right-hand side of the sliding carriage 45 an electric motor 51 with shaft 52 pulls the sliding carriage 45 in the direction of the arrow slowly from left to right by way of one or more deflecting pulleys 54, 54a. The electric motor 51 is firmly attached to the base frame 40 and merely for the sake of clarity shown separately in FIG. 6. To enable the sliding carriage 45 to perform oscillatory movements in addition to straight-line movements with respect to the scanning means 101 to 111, the long sides of the section frame 41 are connected by means of a connecting member 55, which does not interfere with the right-hand movement of the sliding carriage 45. The connecting member 55 is provided with two downwardly arranged rectangular blocks 56 and 56a which, as shown in FIGS. 6a and 6b, receive a slide block 57 between them. The slide block 57 slides between the two facing sides of the rectangular blocks 56 and 56a. The slide block 57 is provided with a bore which receives a pin 58. If the sliding carriage 45 arranged in the section frame 41 is to perform non-sinusoidal movements with respect to the scanning means 101 to 111, a disc 59 is fitted to the end of the shaft 52 of the electric motor 51. Recessed into the disc 59 is a curved track 60 corresponding to the desired oscillation pattern (cf. FIG. 6a). The curved track 60 receives the left end of the journal 58 whose other end is inserted into the slide block 57. If the sliding carriage 45 is to perform zigzag movements as required for coding structures recorded on sheets which have been prepared according to FIG. 3, the curved track is a cardioid. Sinusoidal movements may be produced by exchanging the disc 59 for a crank drive which, in the simplest form, as illustrated in FIG. 6b, comprises a disc 61 which is rigidly mounted on the shaft 52 and may have any desired shape, the disc 61 receiving the left end of the journal 58 in a bore 62. The desired oscillation amplitude for a sinusoidal movement is then determined by the distance between the bore 62 and the axis of rotation of the shaft 52. For the return of the sliding carriage 45 in the section frame 41 there may be provided either another rope (not shown) which is operated by the electric motor 51 and which is attached to the left-hand side of the sliding carriage 45 by way of a deflecting pulley, or an energy storing spring mechanism, in which the spring is tensioned while the sliding carriage 45 is moved from left to right, the sliding carriage being returned when tension is released.

What we claim is:

1. Apparatus for the automatic codification of topologically representable structures, especially chemical structural formulae, comprising: a fixed rectangular base frame whose long sides are connected by a cross member arranged under a rectangular section frame incorporating a series of scanning members rigidly arranged therein at standardized spacings, said rectangular section frame being movable parallel to the short sides of said base frame and being connected by a connecting member arranged underneath a sliding carriage movable thereover, said sliding carriage being movable in said section frame without lateral play parallel to both said base frame and said section frame and being moved by a driving motor and carrying the prepared sheet provided with the structure to be coded, said connecting member bearing blocks which, driven by said driving motor via a motor shaft and intermediate driving means, cause said section frame with said sliding carriage to perform transverse movements with respect to said base frame.

2. Apparatus as claimed in claim 1, wherein said scanning members are photoelectric cells, which are arranged in the cross member and the base frame is connected above the sliding carriage by a bridge, said bridge incorporating light sources whose luminous flux is directed to said photoelectric cells arranged in said cross member.

3. A method of digital coding and storing topologically representable structures for documentation by means of data processing which store by coding bonds existing between individual components of a structure as well as the nature of such bonds by means of characteristic data which comprises: entering by line representation the structure to be coded on a sheet provided with a grid of standardized dimensions on which grid the position of each line is determined by the grid coordinates and which grid includes at least one timing track provided with timing marks; causing the sheet containing the timing track and the structure diagram, as entered on said grid, to perform controlled movements with respect to a series of scanning members spaced apart a standardized distance, said members being sensitized by said lines and said timing marks of said timing track, pulsing respective scanning members at times when said lines and said timing marks of said timing track are in the scanning range of said members; coordinating the pulses obtained by said scanning means from said lines with those obtained from said timing marks and transforming said pulses by areas of the gridded sheet into storable pulses, and registering said storable pulses separately and consecutively in cells of a storing means.

4. A method as claimed in claim 3, wherein the sheet which contains the structure to be coded recorded on a standardized grid and timing marks arranged in a timing track, performs zigzag movements relative to the scanning means.

5. A method as claimed in claim 3, wherein the sheet, which contains the structure to be coded recorded on a standardized grid and timing marks arranged in a timing track, performs sinusoidal movements relative to the scanning means.

6. A method as claimed in claim 3, wherein the sheet, which contains the structure to be coded recorded on a standardized grid and timing marks arranged in a timing track, performs straight-line movements relative to the scanning means.

7. A method as claimed in claim 3, wherein the timing marks of the timing track temporarily open and close the pulse circuit of the scanning members at time sequences correlated with the relative position of the grid coordinates and the scanning range of said scanning members on said grid.

8. Apparatus for the automatic coding of topologically respresentable structure structures comprising means on said apparatus mounting a light-permeable sheet provided with a grid, in which grid the positions of the individual grid intersections and subdivision areas are determined by coordinates of a rectangular coordinate system, said sheet being further marked in a predetermined pattern on said grid with markings adapted to affect a light beam, when projected on said markings, in a manner differently from the light beam, when projected on unmarked portions of said gridded sheet, said markings being topological, line representations provided by lines between said coordinates according to a predetermined, marking pattern, light-sensitive scanning means on said apparatus for scanning the gridded area of said sheet, means for effecting relative movement between said scanning means and said marked, gridded sheet in a predetermined scanning pattern, and timing means coordinated with said gridded area and said markings thereon for supplying coordinated timing pulses while said gridded area is scanned by said scanning means in said predetermined scaning pattern.

9. Apparatus as claimed in claim 8 wherein said timing means include spaced, timing marks arranged in a predetermined timing track on said sheet, said marks being of a character adapted to affect a light beam, when projected thereon, in a manner differently from the effect on the light beam of the remainder of said timing track, and additional, light-sensitive scanning means for scanning said timing track during said relative movement in said predetermined scanning pattern.

10. Apparatus as claimed in claim 9 wherein said relative movement is an undulated, relative movement, and said timing track comprises short, spaced marks arranged transversely in a correspondingly undulated path.

11. Apparatus as claimed in claim 10 wherein said topographical representation is a chemical formula including lines outlining chemical ring structure, the atoms represented in said ring structure being coded on said sheet at said grid coordinates, and the last-mentioned coordinates being connected by a plurality of line markings on said gridded sheet outlining the chemical ring structure represented.

12. A process as claimed in claim 3 wherein said entering of the components of said structure to be coded is the marking of a topographical representation of a chemical formula represented on said gridded sheet by lines between grid coordinates according to a predetermined, marking pattern.

13. A process as claimed in claim 12 wherein said topographical representation is a chemical formula including lines outlining chemical ring structure, the atoms represented in said ring structure being coded on said sheet at said grid coordinates, and the last-mentioned coordinates being connected by a plurality of line markings on said gridded sheet outlining the chemical ring structure represented.

14. A method of digital coding and storing topologically representable structures for documentation by means of data processing means which store by coding bonds existing between individual components of a structure as well as the nature of such bonds by means of characteristic data which comprises: entering the components of the structure to be coded on a prepared sheet provided with a grid of standardized dimensions, in which grid the position of each intersection is determined by rectangular coordinates; marking lines each connecting two coordinates on the grid to provide a topologically represented structure with horizontal, vertical, and diagonal lines representing a chemical formula; causing the sheet thus prepared to perform a controlled relative movement to a series of scanning members spaced apart a standardized distance, said members being sensitized by said lines, pulsing respective scanning members at pulse sequence coordinated with said relative movement so that said scanning members are activated when said horizontal, vertical, and diagonal lines are in the scanning range of said members; transforming said pulses by areas of the gridded sheet into storable pulses; and registering said storable pulses separately in cells of a storing means.

References Cited by the Examiner

UNITED STATES PATENTS

| | | | |
|---|---|---|---|
| 316,754 | 4/1885 | Delany | 178—8 |
| 2,518,694 | 7/1950 | Jannopoulo | 340—146.3 X |
| 2,741,312 | 4/1956 | Johnson | 340—149 |
| 2,792,173 | 5/1957 | Schuster | 235—183 X |
| 2,964,734 | 12/1960 | West | 340—149 |
| 3,052,405 | 9/1962 | Woodland | 235—61.11 |

MALCOLM A. MORRISON, *Primary Examiner.*

IRVING L. SRAGOW, DARYL W. COOK, *Examiners.*

K. E. JACOBS, W. S. POOLE, *Assistant Examiners.*